J. W. WATTLES.

Ring for Ring Spinning.

No. 9,382. Reissued Sept. 21, 1880.

Witnesses.

James Schouler

Ellis L. Mott

Inventor.

Joseph W. Wattles

N. PETERS, PHOTO-LITHOGRAPHER, WASHINGTON, D. C.

UNITED STATES PATENT OFFICE.

JOSEPH W. WATTLES, OF CANTON, MASSACHUSETTS.

RING FOR RING-SPINNING.

SPECIFICATION forming part of Reissued Letters Patent No. 9,382, dated September 21, 1880.

Original No. 75,610, dated March 17, 1868; Reissue No. 3,165, dated October 20, 1868; Reissue No. 7,857, dated August 21, 1877; Reissue No. 8,811, dated July 15, 1879. Application for reissue filed November 8, 1879.

*To all whom it may concern:*

Be it known that I, JOSEPH W. WATTLES, of Canton, in the county of Norfolk and State of Massachusetts, have made a new and useful Improvement in Rings for Ring-Spinning; and I do hereby declare the same to be fully described in the following specification and represented in the accompanying drawings.

Figure 1:
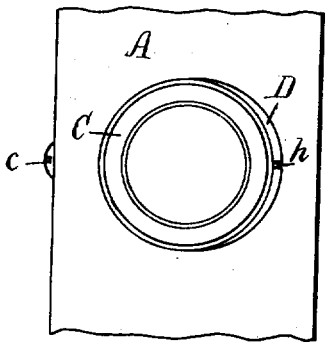
Figure 2:
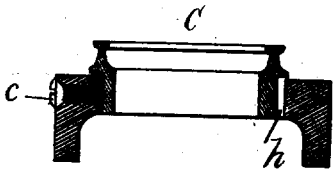
Figure 3:
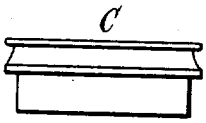
Figure 5:
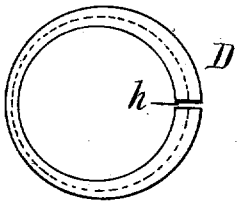
Figure 4:
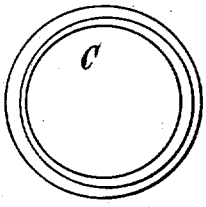
Figure 7:
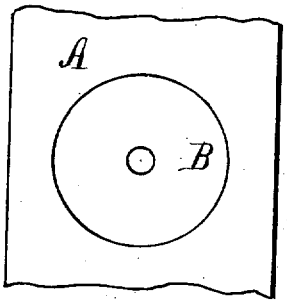
Figure 6:
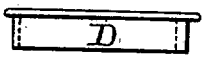
Figure 8:
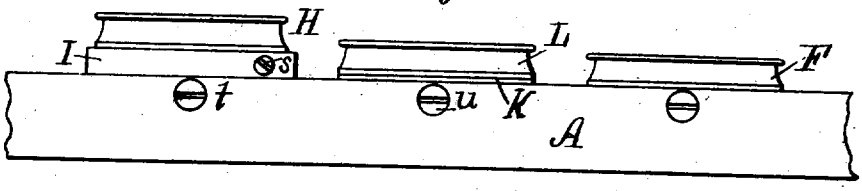

Figure 1 is a top view, and Fig. 2 a transverse vertical section, of a ring-rail with my invention applied thereto. Fig. 3 is a side elevation, and Fig. 4 an under-side view, of a race-ring. Fig. 5 is a top view, and Fig. 6 a side view, of a race-ring receiver or holder. Fig. 7 is a top view of a ring-rail and spindle without my invention applied thereto. Fig. 8 shows my improved ring set in a socket of a rail and held in place by a screw, a common race-ring, and a ring in two parts—that is, a race-ring and a receiver—the latter being provided with a screw-hole and screw for the purpose of keeping the parts together, another screw being employed to hold them in the rail.

My present invention may be regarded as an improvement on the adjustable spinning-ring shown in patent of H. G. Hall, No. 68,185; and it consists, principally, of a double ring, one portion of which is a race-ring and the other a split receiver thereof.

When a race-ring is combined with a contractile receiver and placed in the socket of a ring-rail a single screw will hold the two parts in place.

One of the main features of my invention is a contractile receiver. I form it as a thin ring, and in order to have it readily compressible on the race-ring I make a split in said receiver transversely at one point of its circumference by sawing through it from its outer to its inner periphery, or by removing from it a small portion, so that it may not be an entire annulus. The said receiver is easily sprung or contracted diametrically, and kept in place by pressure of the set-screw used to hold it in place in the socket of the ring-rail.

In the drawings, A denotes the ring-rail, and B the socket thereof; C, the race-ring, and D the receiver.

The outer periphery of the shank of the race-ring is eccentric with respect to its bore. The bore of the receiver is cylindrical and eccentric relatively to the outer surface of the shank of such receiver.

The screw is seen at *e* as screwed into the ring-rail and against the outer periphery of the receiver. The cross-cut or opening of the receiver is represented at *h*.

The purpose of my present invention is to provide manufacturers with a spinning-ring which, when placed in the socket of the ring-rail of a spinning-frame, may be easily adjusted to any ordinary eccentricity of the spindle by a movement of one part or the other, or both.

In said Fig. 8, A denotes the ring-rail; F, a common race-ring; H and I, a combined race-ring and receiver, said receiver being provided with a screw-hole and screw. Said receiver is an entire annulus.

My improved ring is shown at K L, a single screw, *u*, serving to confine it in place.

By examination of Fig. 8 it will be seen that the top or upper surface of the race-ring L is no higher above the rail than that of the common ring F, while that of the elevated race-ring H is very much higher, in consequence of the necessary extension of the receiver I above the rail, to enable the ring to be held in place by the screw *t*. This extra elevation of the ring above the rail causes the yarn to be laid out of place or too high on the bobbin. With my improved ring, as the race-ring L in the receiver K stands no higher above the rail than does the common ring F, there will be no such improper laying of the yarn on the bobbin.

I do not claim a spinning-ring constructed as shown in the United States Patent No. 68,185, the receiver there shown being an entire annulus, and provided with a screw-hole and clamping-screw in order to confine the two parts of the ring together, a second screw being employed in the rail to confine them in the socket thereof.

What I claim is—

1. A race-ring receiver constructed substantially as described, having a cross-cut in its periphery, whereby it is rendered contractible and capable of being compressed on a race-ring.

2. A spinning-ring consisting of a race-ring proper and a split receiver, said parts being adapted to be adjusted substantially as described.

3. A spinning-ring constructed substantially as described, in combination with the ring-rail of a spinning-frame and a screw, whereby the ring is held in position, substantially as described.

JOSEPH W. WATTLES.

Witnesses:
FRANK MORISON,
ELLIS L. MOTTE,
JAMES SCHMEER.